United States Patent [19]
Ito

[11] Patent Number: 6,108,556
[45] Date of Patent: Aug. 22, 2000

[54] METHOD AND SYSTEM FOR LOCATING A MOBILE STATION

[75] Inventor: Shinichiro Ito, Yokohama, Japan

[73] Assignee: Matsushita Electric Industrial Co., Ltd., Osaka, Japan

[21] Appl. No.: 09/016,634

[22] Filed: Jan. 30, 1998

[30] Foreign Application Priority Data

Jan. 31, 1997 [JP] Japan ................................. 9-031425

[51] Int. Cl.⁷ ........................ G01S 3/02; H04B 7/00
[52] U.S. Cl. .................... 455/456; 455/67.6; 455/422
[58] Field of Search ........................ 455/422, 426, 455/456, 457, 502, 503, 458, 67.6, 515, 525, 562; 342/357, 457

[56] References Cited

U.S. PATENT DOCUMENTS

| 5,293,645 | 3/1994 | Sood. |
| 5,943,014 | 8/1999 | Gilhousen ............................. 455/456 |

FOREIGN PATENT DOCUMENTS

| 19533472 | 3/1997 | Germany. |
| 3235077 | 10/1991 | Japan. |
| 2280 327 | 1/1995 | United Kingdom. |
| WO 9500821 | 1/1995 | WIPO. |
| WO 9642020 | 12/1996 | WIPO. |

*Primary Examiner*—Reinhard J. Eisenzopf
*Assistant Examiner*—Lester G. Kincaid
*Attorney, Agent, or Firm*—Lowe Hauptman Gopstein Gilman & Berner

[57] ABSTRACT

This invention relates to a mobile station locating method for locating a mobile station based on a mobile communications system. Radio zones of base stations are dissected into a plurality of search areas (grid sections). A positional relationship between base stations and a concerned search area is defined by mutual time differences in the radio wave propagation between them. The base stations transmit their characteristic signals. Time differences in the propagation of the characteristic signals are caused between transmission of the characteristic signals at respective base stations and reception at a mobile station. Mutual differences in their propagation times are used to identify a search area where the mobile station is present. Thus, the position of the mobile station can be identified by an area not by a point.

13 Claims, 5 Drawing Sheets

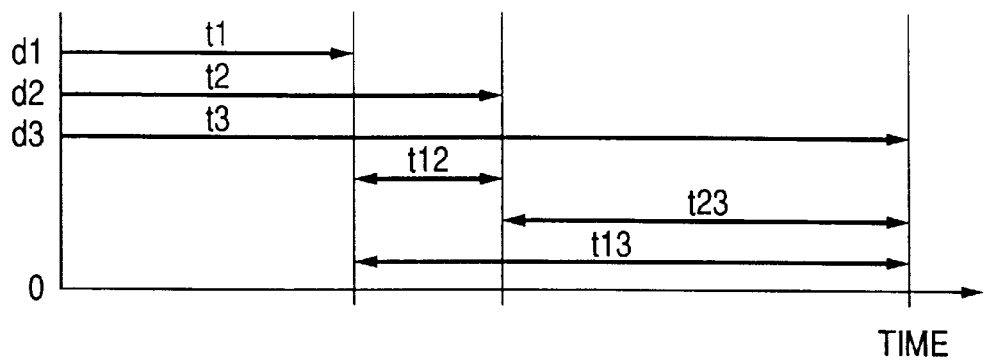
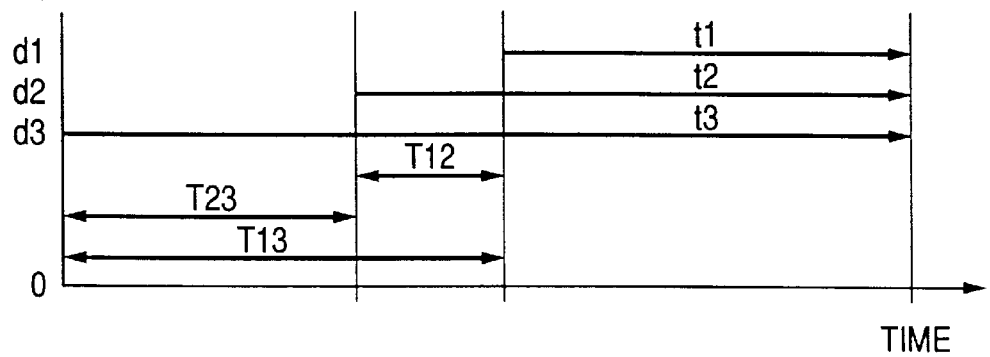
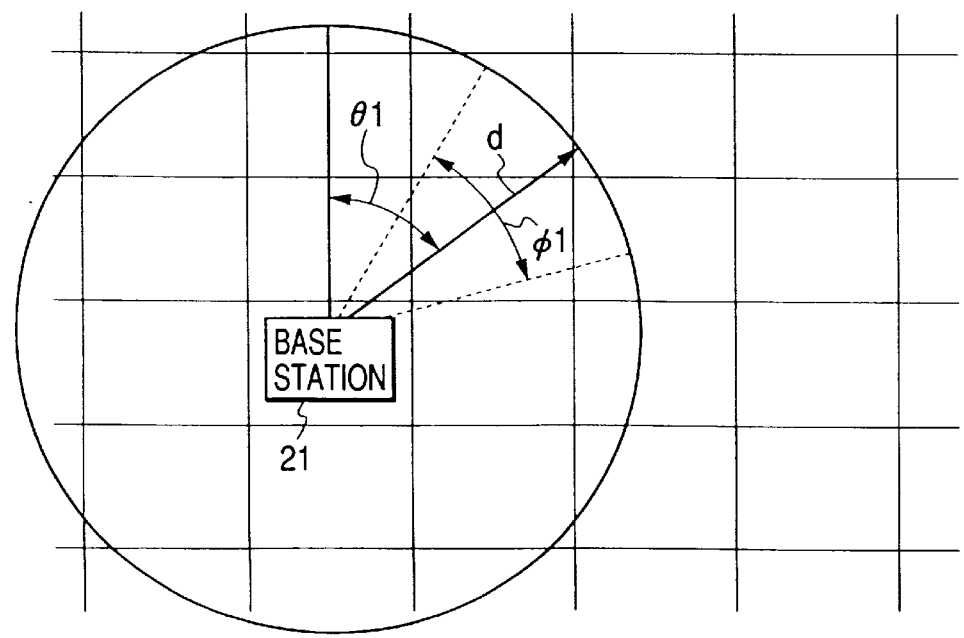

METHOD AND SYSTEM FOR LOCATING A MOBILE STATION

BACKGROUND OF THE INVENTION

The present invention relates to a mobile station locating method for locating a mobile station by utilizing a mobile communication system and also relates to a mobile station locating system for realizing this method. Specifically, the present invention makes it possible to reduce the burden in the calculation (amount and time) required for this locating operation.

According to a conventional mobile communication system, a stable communication between a mobile station and a base station is performed in the following manner. The mobile station measures a field intensity of a radio transmitting line to each neighboring base station, and selects a desirable base station having the highest field intensity. Then, the position of the mobile station is registered in a radio zone of the selected base station. In this manner, a stable radio transmitting line is secured between the mobile station and an optimum base station.

Furthermore, after having secured the most reliable radio transmitting line to the optimum base station, the mobile station intermittently executes the measurement of the field intensity etc. Due to a shift movement of the mobile station, the field intensity to the present base station may become weaker than a field intensity to other base station. This will decrease the reliability of communications significantly. In such a case, the registration of the mobile station's position is renewed from the present station to the next station. Then, the radio transmitting line is switched to a new station. In this manner, an optimum communication line is always secured.

However, according to the conventional mobile communication system, the position of the mobile station can be roughly grasped by the size of a radio zone of a base station. It is however impossible to identify the position of the mobile station precisely at the units of a smaller area.

If identifying the position of the mobile station is feasible, it becomes possible to utilize the positional information of own or a desired mobile station by accessing from the mobile station or via a general telephone. The obtained positional information can be used in various ways. Furthermore, the base station can memorize the positional information of the mobile station. The stored positional information can be utilized as useful data in the processing of various information, such as utilization rate or statistical processing of mobile stations in the radio zone.

Identifying the position of the mobile station can be realized by utilizing a GPS which is widely used these days. In this case, the mobile station needs to incorporate a new system which has not ever used. In view of the foregoing, to identify the position of the mobile station, it is preferable that the mobile station can utilize existing functions of a conventional mobile communication system without largely modifying the existing system. Some methods have been always proposed.

According to Unexamined Japanese Patent Application No. 7-38951, a mobile station transmits a position detecting signal including information for self-identification. At least three neighboring base stations receive this signal and detect a field intensity of the received signal. A central exchange station, connected to each base station, calculates a position of the mobile station based on the information relating to the field intensity of the received signal supplied from each base station. According to this prior art, the central exchange station calculates a distance between the mobile station and each base station based on the field intensity of the received signal. A circle with its center on each base station and having a radius identical with the calculated distance is drawn with respect to each base station. Then, an intersection of the drawn circles is identified as the position of the mobile station.

Furthermore, according to Unexamined Japanese Patent Application No. 3-235077, at least three base stations communicate with a mobile station. A delay time, which corresponds to a time required for a reciprocative radio wave propagation between each base station and the mobile station, is calculated. Then, based on the delay time obtained in each base station, the position of the mobile station is calculated.

However, the above-described mobile station locating methods are characterized in that the position of the mobile station is obtained as a point, and therefore disadvantageous in that a long calculating time is required and a large calculation error may be caused.

FIG. 7 is a schematic view showing a conventional mobile station locating method. According to one method for identifying the position of a mobile station 31, a delay time of a received signal is utilized. Namely, delay times $\Delta t1$, $\Delta t2$ and $\Delta t3$ correspond to reciprocative radio propagation times between the mobile station 31 and the base stations 21, 22 and 23, respectively. Using the measured delay times $\Delta t1$, $\Delta t2$ and $\Delta t3$, distances between the mobile station 31 and respective base stations 21, 22 and 23 are calculated. Then, the position of the mobile station 31 is identified based on the calculated distances from three points of respective base stations 21 to 23.

According to the other method for identifying the position of the mobile station 31, a field intensity of the received signal is utilized. Namely, field intensities R1 to R3 represent the attenuation of the radio waves between the mobile station 31 and the base stations 21, 22 and 23, respectively. Using the measured field intensities R1 to R3, distances between the mobile station 31 and respective base stations 21, 22 and 23 are calculated. Then, the position of the mobile station 31 is identified based on the calculated distances from three points of respective base stations 21 to 23.

However, identifying the mobile station's position as a point is disadvantageous in that a significant amount of calculation error may be caused depending on shifting conditions, such as shifting speed and direction of the mobile station, or radio wave propagating conditions, such as seasons, times, geography, weather, magnetism etc. Especially, in a mobile communication system utilizing microwaves, the calculation error tends to be enlarged due to interactions between the above-described various error factors. Furthermore, when the calculation error needs to be reduced as small as possible, a sophisticated calculation method will be required for calculating the delay times or the field intensities. This increases the calculation time largely.

SUMMARY OF THE INVENTION

To solve the above-described conventional problems, the present invention has an object of providing a mobile station locating method which is capable of enlarging an allowable error range in the calculation and reducing the total calculation time. Furthermore, the presents invention provides a mobile station locating system performing the above-described locating method.

In order to accomplish the above-described and other related objects, the present invention provides a novel and excellent method for locating a mobile station. A plurality of search areas, each being narrower than a radio zone of a base station, are set. Each search area is defined by mutual time differences in a radio wave propagation from respective base stations. Characteristic signals are transmitted from respective base stations and received by a mobile station. Time differences caused in the reception of these characteristic signals are used to identify a specific search area where a mobile station is present.

The present invention provides a mobile station locating system with base and mobile stations. The base station comprises a base station's characteristic signal generating means for generating a characteristic signal, a base station's characteristic signal synchronizing means for controlling a transmitting time of the characteristic signal in synchronism with transmitting times of other characteristic signals of neighboring base stations, a positional information memory means for storing positional information of the search areas, and a positional information calculating means for identifying the specific search area where the mobile station is present based on information sent back from the mobile station in response to reception of the characteristic signal, with reference to the positional information stored in the positional information memory means. The mobile station comprises a characteristic signal delay time calculating means for calculating time differences in the reception of the characteristic signals transmitted from respective base stations.

According to the present invention, the position of the mobile station is identified by an area, i.e. a two-dimensional area, not by a point. Thus, an allowable error range in the calculation can be enlarged. Furthermore, the present invention calculates mutual time differences in the reception of the characteristic signals. This makes it possible to reduce the substantial calculation time compared with a case where a radio wave propagation time itself between each base station and the mobile station is used in the calculation.

More specifically, a first aspect of the present invention provides a method for locating a mobile station based on a mobile communications system, comprising the steps of: setting a plurality of search areas (a1, a2, - - -) each being narrower than a radio zone (211, 221, 231, 241, or 251) of a base station; defining a positional relationship between each base station and a concerned search area based on mutual time differences in a radio wave propagation between the base stations and the concerned search area; transmitting characteristic signals (d1, d2, d3) from respective base stations (21, 22, 23); obtaining mutual time differences (t12, t23, t13; T12, T23, T13) in the propagation of the characteristic signals caused between transmission of the characteristic signals at respective base stations and reception at a mobile station (31); and identifying a specific search area where the mobile station is present based on the mutual differences between the characteristic signals. Thus, the position of the mobile station can be identified by an area not by a point.

Preferably, the base stations transmit their characteristic signals simultaneously, while the mobile station calculates time differences in a reception of the characteristic signals and sends back a calculated result to the base stations. Thus, the base stations can identify a specific search area defined by the time differences calculated by the mobile stations.

Preferably, the base stations transmit the characteristic signals to a target search section, which is successively changed, in such a manner that the characteristic signals arrive the target search area at the same time, while the mobile station sends back a confirmation signal to the base stations when the mobile station receives the characteristic signals simultaneously. Thus, the base stations can identify a specific search area based on time differences in the transmitting times of the characteristic signals at respective base stations.

A second aspect of the present invention provides a mobile station locating system for setting a plurality of search areas (a1, a2, - - -) each being narrower than a radio zone (211, 221, - - -, or 251) of a base station (21, 22, or 25) of a mobile communications system and identifying a specific search area where a mobile station is present. The mobile station locating system comprises base and mobile stations. The base station (21) comprises a base station's characteristic signal generating means (41) for generating a characteristic signal (d1) of the base station; a base station's characteristic signal synchronizing means (42) for controlling a transmitting time of the characteristic signal (d1) in synchronism with transmitting times of other characteristic signals (d2, d3) of neighboring base stations (22, 23); a positional information memory means (44) for storing positional information of the search areas: a positional information calculating means (43) for identifying the specific search area where the mobile station (31) is present based on information sent back from the mobile station in response to reception of the characteristic signal, with reference to the positional information stored in the positional information memory means; and a shift hysteresis memory means (45) for storing shift hysteresis of the mobile station. On the other hand, the mobile station (31) comprises a characteristic signal delay time calculating means (51) for calculating time differences (t12, t23, t13) in the reception of the characteristic signals transmitted from respective base stations; a positional information output interface means (52) for outputting positional information of the mobile station inquired to the base stations; and a positional information notifying means (53, 54) for notifying positional information of the mobile station obtained from the base station. With this system, the above-described mobile station locating method can be performed.

Preferably, the characteristic signal generated from the base station's characteristic signal generating means is an intrinsic pulse signal allocated to each base station, a modulation signal modulated differently by each base station, or a characteristic frequency signal allocated to each base station. The mobile station, received the characteristic signals, can discriminate these characteristic signals and calculate mutual time differences in the radio wave propagation between respective base stations.

Preferably, the positional information calculating means identifies map information, such as latitude/longitude, region name or lot number, representing the specific search area where the mobile station is present based on the positional information stored in the positional information memory means. Thus, the position of the mobile station can be indicated by using appropriate latitude/longitude, a region name or a lot number.

Preferably, the positional information notifying means of the mobile station is a sound output device (53) generating voice message including the positional information and/or a character display unit (54) displaying letters representing the positional information. Thus, it becomes possible to realize a sound or character display of the position of own or an intended mobile station by requesting the base station.

Preferably, the base station has a directional antenna ($\phi 1$, $\theta 1$) to transmit the characteristic signal. With this arrangement, the azimuth of the directional antenna can be utilized for identifying the search area. Thus, the accuracy in the position identification can be improved.

Reference numerals in parentheses added in the foregoing description show the correspondence to the components disclosed in preferred embodiments of the present invention. Thus, the reference numerals are merely used for expediting the understanding to the present invention and not used for narrowly interpreting the scope of the present invention.

BRIEF DESCRIPTION OF THE DRAWINGS

The above and other objects, features and advantages of the present invention will become more apparent from the following detailed description which is to be read in conjunction with the accompanying drawings, in which:

FIG. 5A is a time chart showing transmitting timings of base station's characteristic signals performed by the mobile station locating method in accordance with the first embodiment of the present invention;

FIG. 5B is a time chart showing transmitting timings of base station's characteristic signals performed by the mobile station locating method in accordance with the second embodiment of the present invention;

FIG. 6 is a view schematically showing a mobile station locating method in accordance with the third embodiment of the present invention.

DESCRIPTION OF THE PREFERRED EMBODIMENTS

Figure 1:
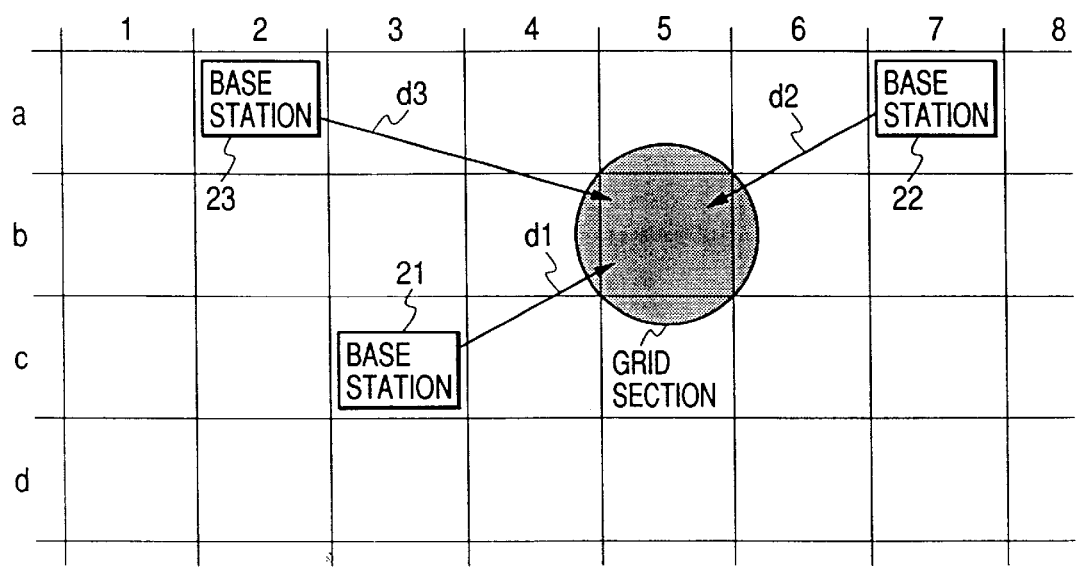
FIG. 1 is a view schematically showing a mobile station locating method in accordance with first, second and third embodiments of the present invention.

Preferred embodiments of the present invention will be explained in more detail with reference to FIGS. 1 through 6. Identical parts are denoted by the same reference numerals throughout the drawing.

First Embodiment

According to a mobile station locating method in accordance with a first embodiment, a grid system is provided to locate a mobile station. As shown in FIG. 1, each two-dimensional (rectangular) section dissected by the grid system is narrower than a radio zone of each base station 21, 22 or 23. This embodiment identifies a grid section where the mobile station is present.

For example, the mobile station may be present at a grid section (5, b) or (6, b). The difference between the grid sections (5, b) and (6, b) can be discriminated by detecting the distance from the mobile station to each base station 21, 22, or 23. To this end, respective base stations 21, 22 and 23 send out position detecting signals (base station's characteristic signals) d1, d2 and d3 simultaneously. The mobile station receives the base station's characteristic signals sent from base stations. A time difference, caused in the reception of the base station's characteristic signals, varies depending on the grid section where the mobile station is present.

According to this mobile station locating method, time differences are memorized beforehand in relation to each grid section. More specifically, arrival times of the base station's characteristic signals d1, d2 and d3 sent simultaneously from respective base stations 21 to 23 are measured at each grid section. Then, time differences between received signals are stored in a memory. The memorized data in this manner are used later in identifying the present location of the mobile station by comparing actually received base station's characteristic signals with the memorized data.

Figure 2:
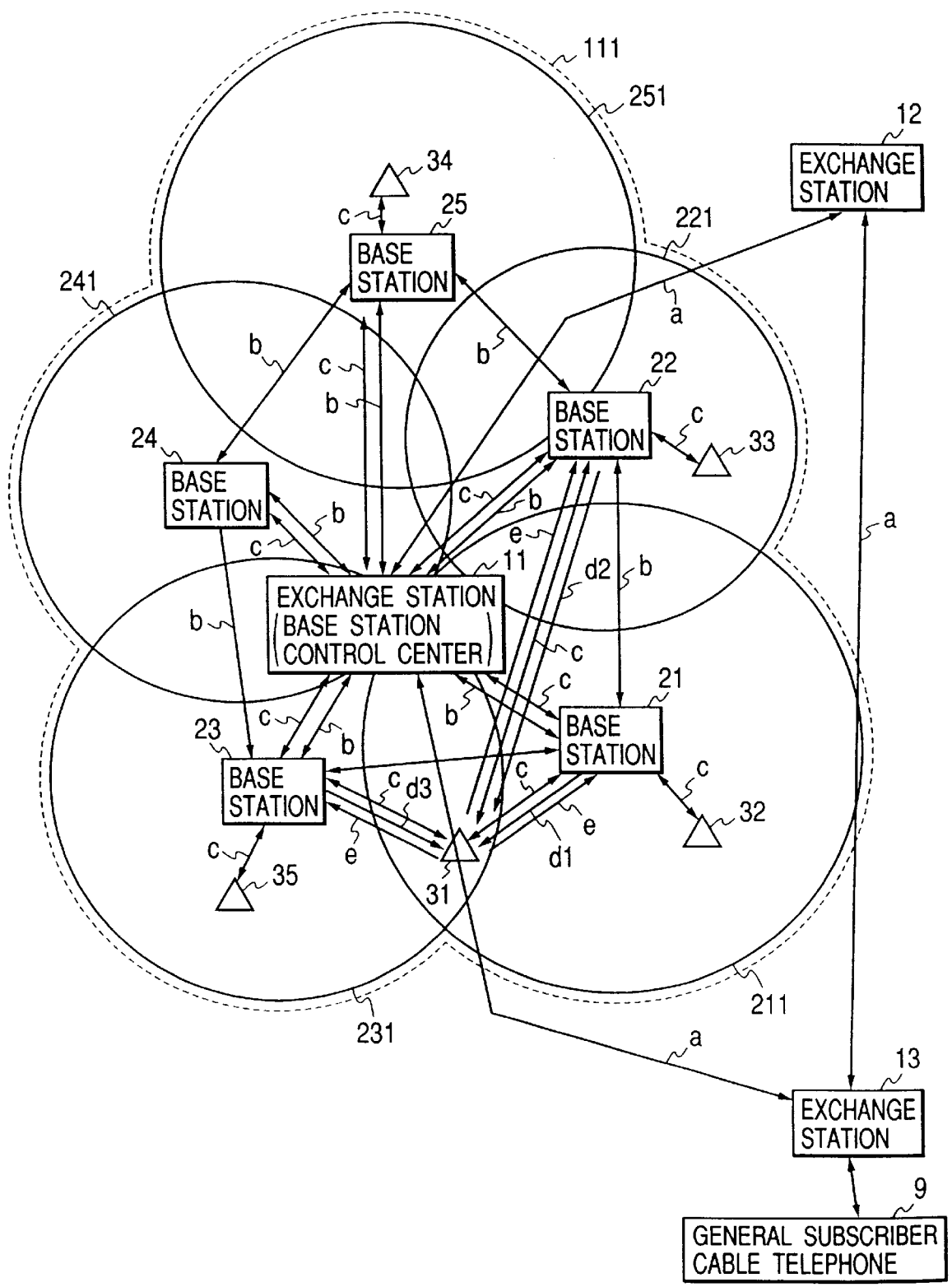
FIG. 2 is a block diagram showing a mobile station locating system in accordance with the first, second and third embodiments of the present invention.

FIG. 2 shows an arrangement of a communication system performing the above-described mobile station locating method. Base stations 21, 22, 23, 24 and 25 have their respective radio zones 211, 221, 231, 241 and 251, respectively. A plurality of mobile stations 31, 32, 33, 34 and 35 are capable of communicating with the base stations 21, 22, 23, 24 and 25. These base stations 21, 22, 23, 24 and 25 are located in an administration area 111 of a central exchange station 11. The central exchange station 11 controls all of base stations 21, 22, 23, 24 and 25.

The central exchange station 11 transmits and receives sync signals "b" as well as control signals "c" to and from the base stations 21 to 25 in its administration area 111. The sync signals "b" are used to synchronize the base station's characteristic signals "d." Furthermore, the central exchange station 11 transmits and receives various signals "a" to and from other exchange stations 12 and 13. General subscribers' telephones 9 are connected to each exchange station by cable.

The base stations 21 to 25 transmit and receive the control signals "c" to and from the mobile stations 31 to 35 in their respective radio zones. Furthermore, the base stations 21 to 25 transmit and receive the sync signals "b" to and from other base stations. It is assumed that the mobile station 31 is the one to be located by the present invention. The base station's characteristic signals d1, d2 and d3 are transmitted together with the control signal "c" from base stations 21, 22 and 23 to the mobile station 31. The mobile station 31 calculates time differences in the reception of respective base station's characteristic signals d1, d2 and d3. Then, a confirmation signal "e" representing a calculation result is sent back to each base station.

Figure 3:
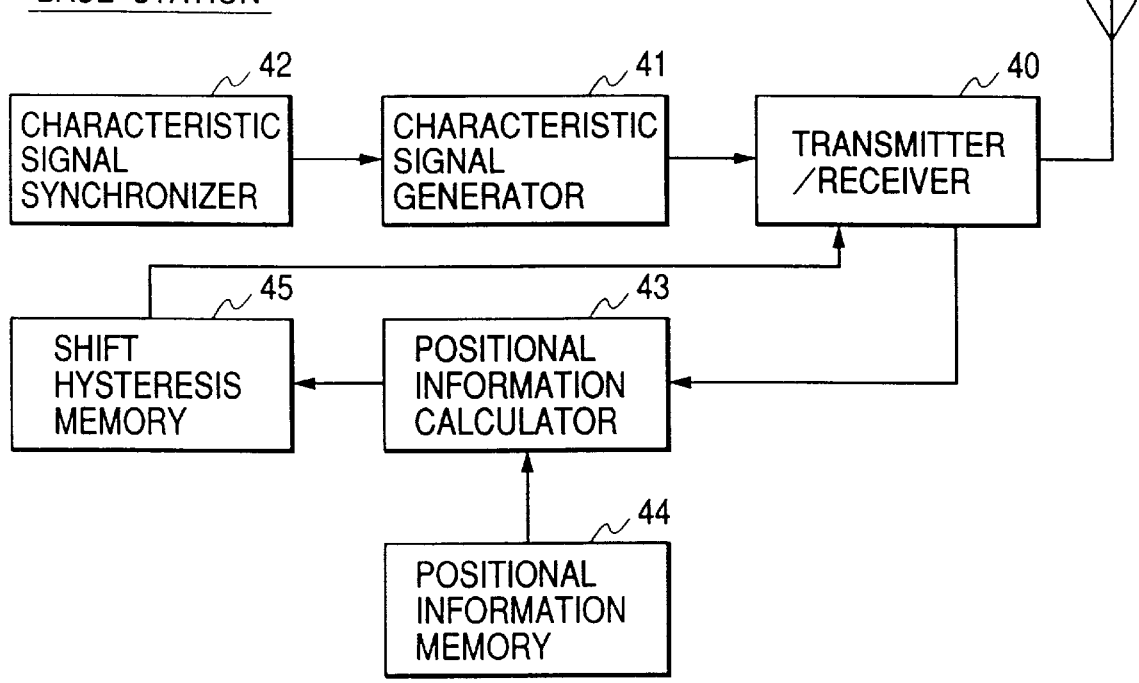
FIG. 3 is a block diagram showing an arrangement of a base station in the mobile station locating system in accordance with the first, second and third embodiments of the present invention.

FIG. 3 shows a schematic arrangement of each base station employed in this communication system. A base station's characteristic signal generator 41 generates a base station's characteristic signal. A base station's characteristic signal synchronizer 42 synchronizes the base station's characteristic signal in response to the sync signal "b." A transmitter/receiver 40 transmits and receives the signals. A positional information memory 44 stores the data relating to the positional information measured beforehand in relation to each grid section. A positional information calculator 43 converts the confirmation signal received from the mobile station into positional information relating to the grid, with reference to the stored positional data. A shift hysteresis memory 45 stores hysteresis in the shifting movement of the mobile station.

The positional information memory 44 stores a table describing the range of time differences between the base station's characteristic signals measured at each grid section in connection with the latitude/longitude or a region name or a lot number representing this grid section. The positional information calculator 43 converts the confirmation signal received from the mobile station into the corresponding latitude/longitude or region mane or the lot number.

Figure 4:
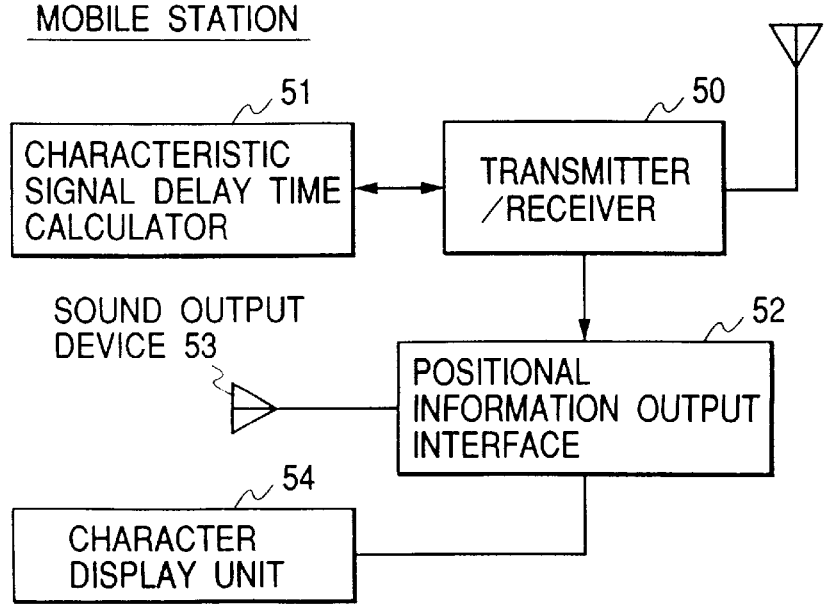
FIG. 4 is a block diagram showing an arrangement of a mobile station in the mobile station locating system in accordance with the first, second and third embodiments of the present invention.
Figure 7:
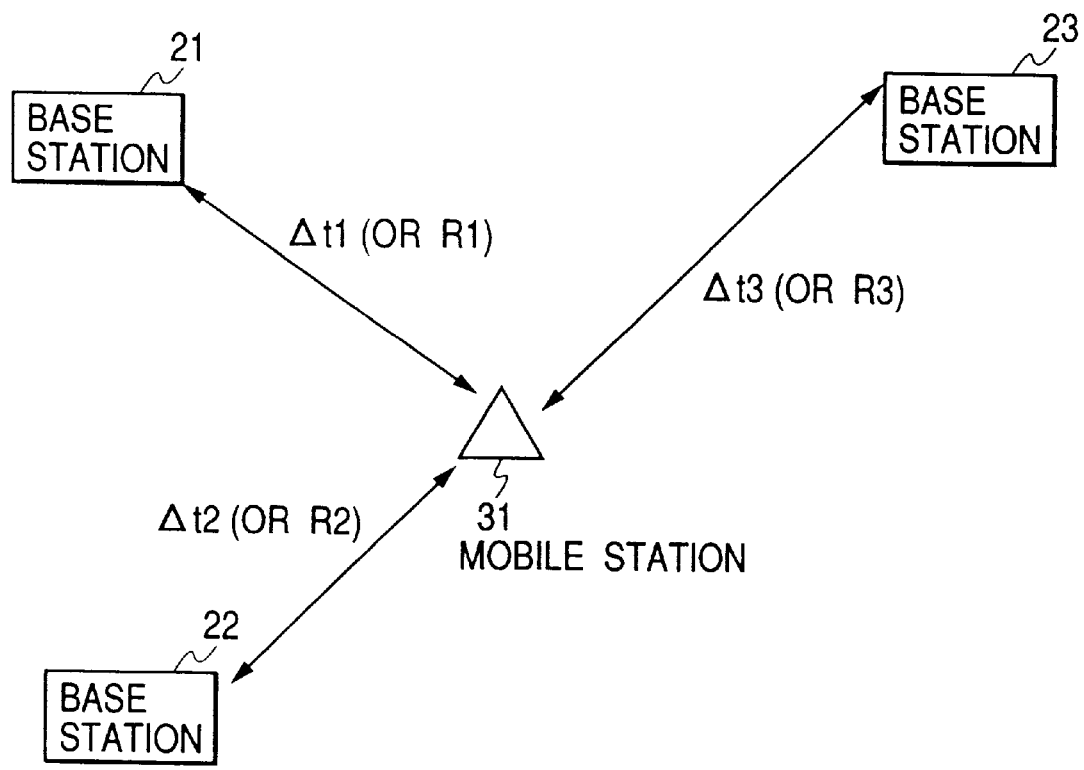
FIG. 7 is a view schematically showing a conventional mobile station locating method.

FIG. 4 shows a schematic arrangement of the mobile station. A characteristic signal delay time calculator 51 calculates time differences between received base station's characteristic signals and produces the confirmation signal based on the calculated time differences. A transmitter/receiver 50 transmits or receives the signals. A positional information output interface 52 outputs positional information inquired to the base station. A sound output device 53 generates a voice message including the positional information. A character display unit 54 displays letters representing the positional information.

An operation of this system, especially functions of the mobile station 31, will be explained.

First, the mobile station 31 transmits and receives the control signal "c" to and from the base stations 21, 22 and 23 to register the position of this mobile station 31 to their radio zones. Meanwhile, the field intensity is measured between the mobile station 31 and the base stations 21, 22 and 23. The data relating to the measured field intensities are exchanged with the base stations 21, 22, and 23 together with the control signals. According to the embodiment shown in FIG. 2, the mobile station 31 is registered to the radio zone of the base station 21.

In the exchange of the control signals "c", respective base stations 21, 22 and 23 generate base station's characteristic signals d1, d2 and d3 from their base station's characteristic signal generators 41 under the synchronization control performed by their base station's characteristic signal synchronizers 42. The base station's characteristic signals d1, d2 and d3 are thus simultaneously transmitted to the mobile station 31. The base station's characteristic signals "d" may be an intrinsic pulse signal allocated to each base station, a modulation signal modulated differently by each base station, or a characteristic frequency signal allocated to each base station.

To identify the present grid section, the mobile station 31 needs to receive a plurality of base station's characteristic signals "d" (i.e., d1, d2 and d3) transmitted from at least three base stations (i.e., 21, 22, and 23), except for special cases. The radio zones 211, 221, 231, 241 and 251 of the base stations require a strong field intensity of a certain degree to stabilize the communications between the mobile station and the base stations. However, the characteristic signals and confirmation signals, which are chiefly used for locating the mobile station, can be transmitted under weaker field intensities. Accordingly, the area available such a lower field intensity required for the locating signals is wider than the radio zone of each base station.

After the mobile station 31 received the base station's characteristic signals d1 to d3, the characteristic signal delay time calculator 51 calculates time differences between the received base station's characteristic signals and the transmitter/receiver 50 transmits the confirmation signal "e" to the base station 21 of the radio zone to which the position of the mobile station 31 is registered.

More specifically, as shown in FIG. 5A, the base station's characteristic signals d1 to d3 are transmitted at the same time from the base stations 21, 22 and 23, respectively. The characteristic signal delay time calculator 51 of the mobile station 31 calculates a time difference t12 between a reception time t1 of the characteristic signal d1 and a reception time t2 of the characteristic signal d2, a time difference t23 between the reception time t2 of the characteristic signal d2 and a reception time t3 of the characteristic signal d3, and a time difference t13 between the reception time t3 of the characteristic signal d3 and the reception time t1 of the characteristic signal d1. The confirmation signal "e", representing the calculated results t12, t23 and t13, is transmitted to the base station 21.

The characteristic signals' time differences t12, t23 and t13 are variable depending on the position of a concerned grid section. In other words, these values are inherent to each grid section. Thus, when a confirmation signal "e" is given, a corresponding grid section can be identified unequivocally.

When the base station 21 receives the confirmation signal "e", the positional information calculator 43 searches or retrieves a confirmation number (b5 in FIG. 1) of a grid section corresponding to the confirmation signal "e" with reference to the positional information data stored in the positional information memory 44. That is, the positional information calculator 43 identifies a corresponding grid section having a time difference range including the time differences t12, t23 and t13 of the base station's characteristic signal represented by the confirmation signal "e." The searched result is converted into appropriate data, such as latitude/longitude, region name, lot number, which are available as map information.

The calculated positional information is stored in the shift hysteresis memory 45 which memorizes the hysteresis in the shifting movement of the mobile station. It is always allowed to refer to the hysteresis data stored in the shift hysteresis memory 45.

When the mobile station 31 checks its own position or its shift hysteresis, the mobile station 31 communicates with the base station 21 to which the position of the mobile station 31 is registered and gets the related information stored in the shift hysteresis memory 45. The data obtained from the shift hysteresis memory 45 are output to the sound output device 53 or to the character display unit 54 via the positional information output interface 52. Thus, the voices or letters representing the positional information are generated.

Furthermore, the base stations 21 to 25 can exchange the data stored in their shift hysteresis memories 45 via the central exchange station 11. The central exchange station 11 and other exchange stations 12 and 13 can exchange the information relating to the shift hysteresis stored in the base stations located in their administration areas. Therefore, the mobile station 31 can check the position or shift hysteresis of its own and other mobile stations 32 to 35 via the base station 21 to which the position of the mobile station 31 is registered. Moreover, the mobile station 31 can check the position or shift hysteresis of other mobile stations belonging to other administration area. Furthermore, the mobile station 31 can check the position or shift hysteresis of any mobile station via each base station or the general subscriber's telephone 9 connected to the exchange station by cable.

In this manner, the above-described method for locating a mobile station identifies a grid section where an intended mobile station is present. This is robust against an error which may be caused by the mobile station in the calculation of the time difference between the base station's characteristic signals. The grid where the mobile station is present can be detected accurately even when a calculation error is caused much or less. In other words, an allowable range of the calculation error can be enlarged.

According to the above-described embodiment, the mobile station receives the base station's characteristic signals transmitted from at least three base stations. However, the number of the base stations from which the base station's characteristic signals are transmitted can be reduced, when a large error range is allowed or when a position detecting error can be compensated later. For example, using a directional antenna shown in a later-described third embodiment is effective to compensate the position detecting error.

Furthermore, the timing for locating the mobile station is not limited to the registration of the position of the mobile station and therefore can be performed anytime.

Second Embodiment

A second embodiment of the present invention relates to a mobile station locating method which is capable of reducing the burden of the mobile station. The mobile station locating method in accordance with the second embodiment can be realized by the same arrangement as that of the first embodiment.

According to the locating method of the second embodiment, as shown in FIG. 5B, the base station's characteristic signals d1, d2 and d3 transmitted from respective base stations arrive a target grid section at the same time. To this end, respective base stations mutually control the transmitting timings of their base station's characteristic signals d1, d2 and d3. Similar adjustment is performed for each of grid sections. Thus, by successively changing the target grid section, each base station transmits the base station's characteristic signal in accordance with the adjusted timing.

For example, after the base station 23 transmits the base station's characteristic signal d3, a delay time of T23 is provided before the base station 22 transmits the base station's characteristic signal d2. The base station's characteristic signal synchronizer 42 controls the provision of the delay time T23 so that the base stations' characteristic signals d2 and d3 arrive at the grid section (5, b) at the same time. In the same manner, after the base station 22 transmits the base station's characteristic signal d2, a delay time of T12 is provided before the base station 21 transmits the base station's characteristic signal d1. The base station's characteristic signal synchronizer 42 controls the provision of the delay time T12 so that the base stations' characteristic signals d1 and d2 arrive at the grid section (5, b) at the same time. In other words, after the base station 23 transmits the base station's characteristic signal d3, a delay time of T13 is provided before the base station 21 transmits the base station's characteristic signal d1. Subsequently, a predetermined time interval is provided. After the predetermined time has passed, the base stations 21, 22 and 23 transmit the base stations' characteristic signals d1, d2 and d3 under the control of their transmission timings, so that the base stations' characteristic signals d1, d2 and d3 arrive at the next grid section (5, c) at the same time. The transmitting operations of the base stations 21, 22 and 23 are repetitively performed for each target grid section which is successively changed among the grid sections.

On the other hand, the mobile station 31 receives the base stations' characteristic signals d1, d2 and d3 transmitted from the base stations 21, 22 and 23, respectively. When the base stations' characteristic signals d1, d2 and d3 have arrived within a predetermined allowable time difference, the mobile station 31 transmits the confirmation signal "e" to the base station 21.

The base station 21, after having received the confirmation signal "e", identifies a recognition number of a present grid section based on the transmission time differences T12, T23 and T13 for the base stations' characteristic signals transmitted last from the base stations 21 to 23. The recognition number is converted into the corresponding data of latitude/longitude, region name, or lot number representing the identified grid section. The shift hysteresis memory 45 stores the hysteresis data relating to the shifting movement of the mobile station.

As apparent from the foregoing description, the above-described mobile station locating method makes it possible to detect the position of the mobile station easily. The mobile station detects its position by solely confirming whether the base stations' characteristic signals d1 to d3 have arrived within a predetermined time difference. Compared with the method of the first embodiment, the burden of the mobile station for the calculation can be reduced.

Third Embodiment

A third embodiment of the present invention relates to a mobile station locating method which utilizes a directional antenna to increase the accuracy in the locating of the mobile station.

FIG. 6 shows a base station of this locating system. A directional antenna having a beam angle $\phi 1$ is used to transmit the base station's characteristic signals "d" and the control signals "c." When $\theta 1$ represents an azimuth of the directional antenna, the base station's characteristic signal "d" is transmitted with a narrower angular zone $\phi 1$ having its center on an angular position $\theta 1$. The base station identifies a grid section where a concerned mobile station is present by using the locating method explained in the first or second embodiment. In this case, the accuracy in the position identification can be improved by processing the information involved in the confirmation signal "e" sent from the mobile station together with the azimuth information $\theta 1$ of the directional antenna. As a result, it becomes possible to reduce the number of base stations transmitting the base station's characteristic signals to the mobile station for the locating of the mobile station.

As apparent from the foregoing description, according to the mobile station locating method of the present invention, there is no necessity of identifying the position of the mobile station as a point, as was so in the prior art. Instead, the present invention identifies the grid section (i.e., two-dimensional area) where the mobile station is present. Accordingly, it becomes possible to enlarge an allowable error range in the locating calculation. The requirement to the calculation accuracy can be moderated and the calculation burden can be reduced.

Furthermore, the mobile station locating method of the present invention adopts a method for identifying the grid section based on mutual time differences in the radio wave propagation between respective base stations and the concerned grid section. This makes it possible to reduce the substantial amount and time required in the calculations for the locating of the mobile station compared with a case where a delay time is calculated based on an actual radio wave propagation time between each base station and the grid section or based on a reciprocative radio wave propagation time between them.

Moreover, the present invention adopts the mobile station locating method for controlling the transmitting timings of the base stations' characteristic signals so that the base stations' characteristic signals arrive at the target grid section at the same time. According to this method, it becomes possible to reduce the calculation burden of the mobile station. Thus, the mobile station need not expand its scale or capacity.

Furthermore, according to the mobile station locating method of the present invention, it becomes possible to effectively locate the mobile station.

Moreover, when the directional antenna is employed in the base station, it becomes possible to improve the accuracy in the identification of the position of the mobile station.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A method for locating a mobile station based on a mobile communications system, comprising the steps of:

setting a plurality of two-dimensional search areas each being dissected into a predetermined size narrower than a radio zone of each of a plurality of base stations;

pre-obtaining a positional relationship between said base stations and each of said two-dimensional search areas based on mutual time differences reflecting time differences in radio wave propagation between base stations and said two-dimensional search areas;

transmitting characteristic signals from respective base stations to obtain mutual time differences in the propagation times of said characteristic signals between transmission of said characteristic signals at respective base stations and reception thereof at a mobile station; and identifying a two-dimensional search area where said mobile station is present by comparing the obtained mutual time differences between said characteristic signals with the pre-obtained positional relationship between said base stations and each of said two-dimensional search areas.

2. The mobile station locating method in accordance with claim 1, wherein said base stations transmit said characteristic signals simultaneously, while said mobile station calculates time differences in a reception of said characteristic signals and sends back a calculated result to said base stations.

3. A method for locating a mobile station based on a mobile communications system, comprising the steps of:

setting a plurality of search areas each being narrower than a radio zone of a base station;

defining a positional relationship between each base station and a concerned search area based on mutual time differences in a radio wave propagation between base stations and said concerned search area;

transmitting characteristic signals from respective base stations to obtain mutual time differences in the propagation of said characteristic signals caused between transmission of said characteristic signals at respective base stations and reception at a mobile station, and identifying a specific search area where said mobile station is present based on said mutual time differences between said characteristic signals, wherein said base stations transmit said characteristic signals to a target search section, which is successively changed, in such a manner that said characteristic signals arrive at the target search area at the same time, while said mobile station sends back a confirmation signal to said base stations when said mobile station receives said characteristic signals simultaneously.

4. A mobile station locating system for setting a plurality of two-dimensional search areas each being dissected into a predetermined size narrower than a radio zone of each of a plurality of base stations of a mobile communications system and identifying a specific two-dimensional search area where a mobile station is present, characterized by a base station including:

characteristic signal generating means for generating a characteristic signal of said base station;

characteristic signal synchronizing means for controlling a transmitting time of said characteristic signal in synchronism with transmitting times of other characteristic signals of other base stations;

positional information memory means for storing positional information of said plurality of two-dimensional search areas in advance, said positional information including positional data of each two-dimensional search area with respect to said base stations:

positional information calculating means for identifying said specific two-dimensional search area where said mobile station is present based on information sent back from said mobile station in response to reception of said characteristic signal, with reference to said positional information stored in said positional information memory means; and shift hysteresis memory means for storing shift hysteresis of said mobile station, and said mobile station including:

characteristic signal delay time calculating means for calculating time differences in the propagation of characteristic signals transmitted from respective base stations to the mobile station;

positional information output interface means for outputting positional information of said mobile station to said base stations; and positional information notifying means for notifying positional information of said mobile station obtained from said base station.

5. The mobile station locating system in accordance with claim 4, wherein said characteristic signal generated from said characteristic signal generating means of said base station comprises one of a group of signals consisting of an intrinsic pulse signal allocated to each base station, a modulation signal modulated differently by each base station, and a characteristic frequency signal allocated to each base station.

6. The mobile station locating system in accordance with claim 4, wherein said positional information calculating means identifies map information representing said specific two-dimensional search area where said mobile station is present based on the positional information stored in said positional information memory means.

7. The mobile station locating system in accordance with claim 6, wherein said map information includes at least one of latitude/longitude, region name and lot number.

8. The mobile station locating system in accordance with claim 4, wherein said positional information notifying means of said mobile station comprises a sound output device generating voice message including said positional information.

9. The mobile station locating system in accordance with claim 4, wherein said base station has a directional antenna to transmit said characteristic signal.

10. The mobile station locating system in accordance with claim 4, wherein said positional information notifying means of said mobile station comprises a character display unit for displaying letters representing said positional information.

11. A method for locating a mobile station based on a mobile communications system including a plurality of base stations, said locating method comprising the steps of:

setting a plurality of grid sections each being smaller than a radio zone of each base station;

measuring positional relationship of each grid section with respect to said plurality of base stations;

memorizing data relating to positional relationship of each grid section with respect to said plurality of base stations;

transmitting characteristic signals from respective base stations to obtain mutual time differences in the propagation times of said characteristic signals between transmission of said characteristic signals at respective base stations and reception thereof at a mobile station; and identifying a grid section where said mobile station is present based on the obtained mutual time differences between said characteristic signals and on the memorized positional relationship of each grid section with respect to said plurality of base stations.

12. The mobile station locating method in accordance with claim 11, wherein said transmitting step comprises transmitting said characteristic signals from said base stations simultaneously, and wherein said mobile station implements the steps of calculating time differences in reception of said characteristic signals and sending back a calculated result to said base stations.

13. The mobile station locating method in accordance with claim 11, wherein said transmitting step comprises transmitting said characteristic signals from said base stations to a successively changed target grid search section in such a manner that said characteristic signals arrive at the target grid search section at the same time, and wherein said mobile station implements the step of sending back a confirmation signal to said base stations when said mobile station receives said characteristic signals simultaneously.

* * * * *